(12) United States Patent
Piga et al.

(10) Patent No.: US 11,054,883 B2
(45) Date of Patent: Jul. 6, 2021

(54) POWER EFFICIENCY OPTIMIZATION IN THROUGHPUT-BASED WORKLOADS

(71) Applicants: Advanced Micro Devices, Inc., Santa Clara, CA (US); ATI Technologies ULC, Markham (CA)

(72) Inventors: Leonardo De Paula Rosa Piga, Austin, TX (US); Samuel Naffziger, Ft. Collins, TX (US); Ivan Matosevic, Markham (CA); Indrani Paul, Austin, TX (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 16/011,476

(22) Filed: Jun. 18, 2018

(65) Prior Publication Data
US 2018/0364782 A1 Dec. 20, 2018

Related U.S. Application Data

(60) Provisional application No. 62/522,073, filed on Jun. 19, 2017.

(51) Int. Cl.
*G06F 1/324* (2019.01)
(52) U.S. Cl.
CPC .................. *G06F 1/324* (2013.01)
(58) Field of Classification Search
CPC ...................................................... G06F 1/324
See application file for complete search history.

(56) References Cited

U.S. PATENT DOCUMENTS

| | | | |
|---|---|---|---|
| 2006/0123251 A1 | 6/2006 | Nakajima et al. | |
| 2006/0149975 A1 | 7/2006 | Rotem et al. | |
| 2011/0161627 A1* | 6/2011 | Song | G06F 9/5094 712/30 |
| 2011/0264938 A1 | 10/2011 | Henroid et al. | |
| 2013/0054989 A1 | 2/2013 | Judd | |
| 2013/0262831 A1* | 10/2013 | Nelson | G06F 9/30 712/215 |

(Continued)

OTHER PUBLICATIONS

Korean Intellectual Property Office; International Search Report and Written Opinion; International Application No. PCT/US2018/038179; dated Dec. 7, 2018.

*Primary Examiner* — Kim Huynh
*Assistant Examiner* — Joshua Neveln
(74) *Attorney, Agent, or Firm* — Faegre Drinker Biddle & Reath LLP

(57) ABSTRACT

A power management algorithm framework proposes: 1) a Quality-of-Service (QoS) metric for throughput-based workloads; 2) heuristics to differentiate between throughput and latency sensitive workloads; and 3) an algorithm that combines the heuristic and QoS metric to determine target frequency for minimizing idle time and improving power efficiency without any performance degradation. A management algorithm framework enables optimizing power efficiency in server-class throughput-based workloads while still providing desired performance for latency sensitive workloads. The power savings are achieved by identifying workloads in which one or more cores can be run at a lower frequency (and consequently lower power) without a significant negative performance impact.

20 Claims, 4 Drawing Sheets

(56) References Cited

U.S. PATENT DOCUMENTS

| | | | |
|---|---|---|---|
| 2014/0189410 A1* | 7/2014 | Wolski | G06F 1/3206 713/324 |
| 2015/0169035 A1 | 6/2015 | Allen-Ware et al. | |
| 2016/0349828 A1 | 12/2016 | Weissmann et al. | |

* cited by examiner

POWER EFFICIENCY OPTIMIZATION IN THROUGHPUT-BASED WORKLOADS

RELATED APPLICATIONS

This application claims priority to Provisional Application Ser. No. 62/522,073, filed on Jun. 19, 2017, having inventors Leonardo De Paula Rosa Piga et al., titled "POWER EFFICIENCY OF OPTIMIZATION IN THROUGHPUT-BASED WORKLOADS", and is incorporated herein by reference.

BACKGROUND OF THE DISCLOSURE

Many server workloads exhibit stable homogeneous load behavior with a fixed amount of work utilizing various load balancing techniques. These workloads are usually not latency critical and do not have data dependent threads, i.e., the time to process an individual request does not matter as long as average throughput is kept constant. System-on-chip (SoC) power management algorithms need to identify these throughput-based workloads so that frequency can be lowered to minimize idle times without degrading performance, thereby achieving optimal power efficiency. Existing power management algorithms either look at the behavior of individual instruction processors (e.g., single processor), or contain ad-hoc solutions to model the interaction between SoC and workloads, making it unable to differentiate between throughput and latency critical workloads and resulting in sub-optimal operating points.

For example, a collection of local optimization algorithms are unlikely to achieve a globally optimal operating state targeting a specific Quality-of-Service (QoS). Instead, this solution would lead to poor performance and power efficiency. Therefore, as SoCs are becoming increasingly complex, it is becoming important to understand SoC and workload interactions and manage power in a scalable way while optimizing for a global QoS objective.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF EMBODIMENTS

Figure 1:
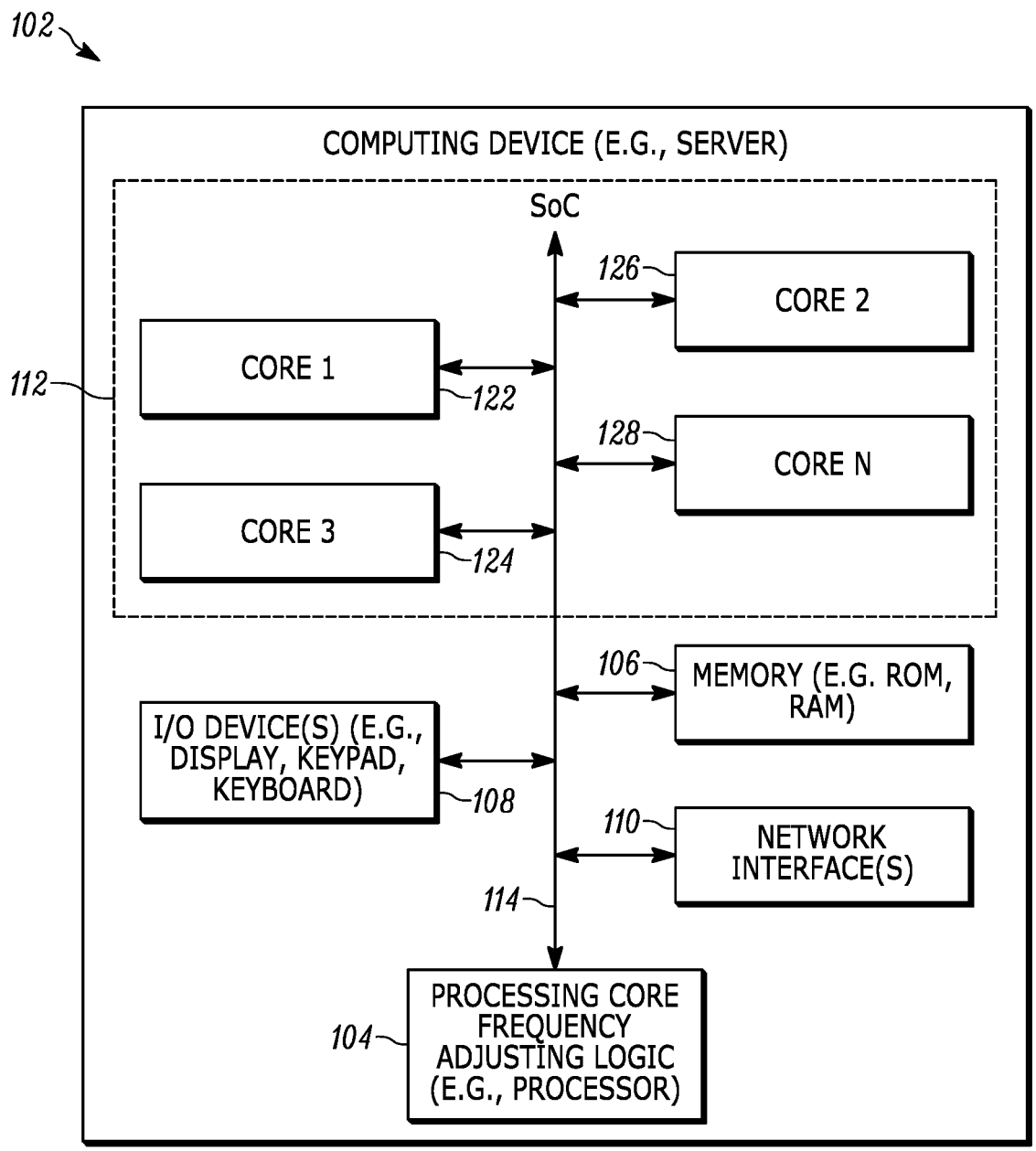
FIG. 1 is a functional block diagram illustrating an example computing device, such as a server, that includes processing core frequency adjusting logic that may adjust the frequency of one or more processing cores in accordance with one example set forth in the disclosure.

Briefly, methods and apparatus provide power efficiency optimization in throughput-based workloads. In one example, a method for optimizing power efficiency in a computing device is described. The computing device may be a server, for example. The computing device determines processing core activity deviation data for processing cores (e.g., CPU, GPU, etc.) in the computing device based on processing core activity data from the processing cores. The computing device adjusts a frequency of at least one of the processing cores in the computing device based on the processing core activity deviation data.

The computing device determines whether the processing core activity deviation data indicates a homogenous workload for the processing cores. In response to determining that the processing core activity deviation data indicates the homogenous workload for the processing cores, the computing device decreases the frequency of the at least one of the processing cores.

In determining the processing core activity deviation data, the computing device determines a number of the processing cores that are active, and an expected number of the processing cores that will be active. The computing device then determines an activity deviation between the number of the processing cores that are active and the expected number of the processing cores that will be active.

Determining the number of the processing cores that are active is based on a processing core activity level for the processing cores. Determining the expected number of the processing cores that will be active is based on a binomial distribution that takes into account the number of the processing cores and the processing core activity level for the processing cores. A processing core is determined to be active when a percentage of active cycles in the processing core in a preceding interval is greater than a threshold, where the preceding interval is based on a moving average window. When determining the processing core activity deviation data, the computing device determines how much a current QoS for the processing cores deviates from a target QoS.

In one example, a system-on-chip or SoC includes a plurality of processing cores and processing core frequency adjusting logic coupled to the plurality of processing cores. The processing core frequency adjusting logic determines processing core activity deviation data for the plurality of processing cores based on processing core activity data from the plurality of processing cores, and adjusts a frequency of at least one of the plurality of processing cores based on the determined processing core activity deviation data.

In another example, a server includes a plurality of processing cores, a network interface, and processing core frequency adjusting logic coupled to the plurality of processing cores and the network interface. The processing core frequency adjusting logic determines processing core activity deviation data for the plurality of processing cores based on processing core activity data from the plurality of processing cores, and adjusts a frequency of at least one of the plurality of processing cores based on the determined processing core activity deviation data.

The present disclosure describes a power management algorithm framework that proposes: 1) a QoS metric for throughput-based workloads; 2) heuristics to differentiate between throughput and latency sensitive workloads; and 3) an algorithm that combines the heuristic and QoS metric to determine target frequency for minimizing idle time and improving power efficiency without any performance degradation.

The present disclosure provides a management algorithm framework to enable optimizing power efficiency in server-class throughput-based workloads while still providing desired performance for latency sensitive workloads. The disclosure aims to achieve power savings by identifying workloads in which one or more processing cores can be run at a lower frequency (and consequently lower power) without a significant negative performance impact. The disclosure addresses at least two problems to make a technique of this kind workable in practice: 1) how to identify workloads whose performance has low frequency sensitivity; and 2) how much can frequency be safely lowered before excessive performance degradation.

The present disclosure presents a solution for, inter alia, 1) differentiating between homogeneous, stable class of workloads with independent threads, with each thread doing a fixed amount of work from workloads that have data dependent threads where the threads are latency-critical; and 2) optimizing power efficiency by reducing idle time in throughput oriented workloads.

For example, a particular QoS algorithm takes a particular "target central processing unit (CPU) idle percentage" (between 0% and 100%) as parameter, and modulates the CPU frequencies to achieve that QoS target. If the CPU idleness is greater than the threshold, the frequency is lowered, and vice versa. For a throughput-based load, desirably the system would want to reduce idleness to zero, taking up all of the slack provided by idle time. However, in practice this will not be possible because the system will need to account for variation in workload behavior and granularity of power state changes. Therefore, the actual idle time being targeted is left as a tunable configuration parameter, to be optimized for the trade-off between power saving and performance degradation.

The QoS metric for system idleness may be calculated using the following formula:

$$\text{Avg. CPU idleness} = \frac{\sum_{i=1}^{N}(\text{idle cycles of Core } i)}{N \times (\text{total cycles})} \quad \text{(Eq. 1)}$$

where N is the total number of processing cores in the system, idle cycles of Core i is the sum of non-C0 (i.e., CC1 and CC6 cycles) of the i-th core, and total cycles is the total number of CPU cycles (both active and idle) at the current CPU frequency during the synchronization management unit (SMU) sample time (1 ms).

This algorithm makes several assumptions about application behavior.

1) The workload is purely throughput-based, and the latency of processing individual requests does not matter for performance as long as the average throughput is kept constant. Therefore, the QoS algorithm does not turn on for any workloads that similarly have alternating periods of active and idle CPU time, but in which the active periods are latency-critical. For example, if the idle periods are spent waiting on input/output (I/O), and there are data dependences between the computation and I/O operations.

2) The algorithm does not necessarily propose separate per-core controls. Rather, it assumes a homogeneous load, for which the same frequency is appropriate for all processing cores. This is a realistic assumption for server workloads, which typically feature load-balancing. However, the algorithm should not turn on for, e.g., lightly-threaded client workloads, resulting in degrading single-thread performance.

3) The load level is stable enough to change slowly relative to the feedback response time of the QoS algorithm. For example, if the load suddenly increases while the frequency is set to target low idle time with a much lower load, the system will obtain lower performance until the feedback response is received.

Since the QoS algorithm requires specific conditions to work properly, and runs the risk of lowering performance if it is turned on for applications where these conditions are not satisfied, it is necessary to have conservative heuristics for when it turns on.

Core Activity Distribution-Heuristic to Differentiate Throughput for Latency Sensitivity Workloads Further observation about throughput-based homogeneous and stable loads is that the distribution of the number of active processing cores at a given moment closely follows a binomial distribution. The number of active cores is defined as those whose percentage of active cycles in a preceding short interval is above a high threshold, e.g., 90%. This is because for such loads, the following characteristics can be observed.

1) The probability of a single processing core being active at different times T1 and T2 is approximately equal, since the load is stable in time. For example, with a 60% load, any given core is active about 60% of the time.

2) The probability is the same for all processing cores, since the load is homogeneous and balanced.

3) The probabilities of any two processing cores being active at a given point in time are uncorrelated.

Therefore, as shown in the following formula, when N processing cores are observed at a given point in time, the expected number of active processing cores is given by the binomial distribution with N trials and probability A, which is equal to activity level.

$$p(k \text{ cores active}) = \binom{N}{k} A^k (1-A)^{N-K} \quad \text{(Eq. 2)}$$

For example, if activity level is 60% and the workload is running on 4 processing cores, the expectation would be that exactly 3 processing cores are active for the fraction of time is equal to $$\binom{4}{3} \times 0.6^3 (1-0.6)^1 = 0.3456,$$

i.e., about 34.6% of the time.

By measuring the actual distribution of the number of active processing cores, and comparing with the theoretical binomial distribution (where N is the number of processing cores and A the average activity level measured for the measurement time interval), how much the application deviates from the type targeted by idle QoS can be estimated. Specifically, this measure will capture the following.

1) Deviation from stable homogeneous and balanced load, which would cause a distribution skewed towards particular processing cores.

2) Deviation from a purely throughput-based load, in which individual units of work are uncorrelated.

It is property 2) that adds value relative to measuring only that the workload is stable and homogeneous. Consider, for example, a workload in which a single thread, fully CPU-bound, is run without CPU affinity and consequently scheduled across N processing cores in a round-robin fashion. This workload would appear stable and homogeneous, with each processing core being active for 1/N of the time. However, turning idle QoS would degrade performance, since it is not throughput-based, but rather each time slice executed on a CPU is dependent on the previous one.

This case is successfully identified by the binomial distribution heuristic, since the distribution will show that exactly one processing core is active for 100% of the time (instead of the binomial distribution with A=1/N). While this is a simple example, similar reasoning shows that for any sort of workload that presents a series of dependent computations, so that reducing CPU frequency would extend the critical path and degrade performance, the distribution will deviate from binomial because the times when individual processing cores are active are correlated.

QoS On/Off Algorithm

In order to avoid performance degradation, the algorithm should be turned on only for workloads that have characteristics described in the previous section. The approach is based on the assumption that certain regularities observed for homogeneous (load-balanced) throughput-based applications will not be observed for any other application type. Specifically, the algorithm turns on QoS when the following conditions are observed.

1) Each processing core has a stable average load for a time period on a scale of tens of seconds.

2) All processing cores are busy with approximately the same average load.

3) Distribution of processing core activity approximates a binomial distribution.

The long time scale required for the stable load level is because for shorter time scales, too much variation in practice is observed. For example, consider the activity diagram from a benchmark program that measures the power and performance characteristics of servers (such as the SpecPower® benchmark provided by Standard Performance Evaluation Corporation (SPEC)), since the length of active intervals varies between a few milliseconds and a few hundred milliseconds, an interval of only a second or two can still have a lot of random variation in how much active time versus idle time it encompasses.

This makes the technique effective for workloads that exhibit a stable load level on a scale of minutes. This will be the case for typical server benchmarks (such as the SpecPower® or SERT™ benchmarks provide by SPEC), which measure stable throttled load levels for several minutes and moreover feature long warmup intervals at each given level before the measurement kicks in.

In order to detect the stable average load, a moving average of activity could be used, but given the time resolution of sampling (1 ms), this would require a lot of memory. Therefore, instead a calculation of ordinary averages on the scale of 1 s can be used and a moving average window for these can be used. The size of the basic averaging interval (1 s), the moving average window (tens of s), the time threshold for a stable workload (tens of s), and the allowed variations (within a single processing core, between processing cores, and divergence from binomial distribution), are all tunable parameters. Similarly, the algorithm is not used when these conditions no longer apply, and load variation within and between processing cores (computed the same way) exceeds the given thresholds.

Turning to the drawings, one example of the presently disclosed computing device 102 is shown in FIG. 1. The computing device 102 may be a server, for example, or any other suitable device. The computing device 102 may be part of a datacenter, or part of a distributed system, such as a cloud-based (e.g., cloud-computing) system.

As indicated in FIG. 1, the computing device 102 includes a processing core frequency adjusting logic 104. The computing device 102 also includes memory 106, such as RAM or ROM or any other suitable memory, which may be used to store parameters, such as parameters associated with the aforementioned algorithms. The memory 106 can also store executable instructions that can be accessed and executed by the processing core frequency adjusting logic 104, as described further below.

The computing device 102 also includes a processing core 1 122, a processing core 2 126, a processing core 3 124, and a processing core N 128. As recognized by those of ordinary skill in the art, the number of processing cores can vary. The processing cores 122, 124, 126, 128 can be, for example, a processing core associated with a CPU, an accelerated processing unit (APU), or a graphics processing unit (GPU). In addition, the processing cores 122, 124, 126, 128 can be part of a SoC 112. In other examples, the SoC 112 can be a heterogeneous SoC, an APU, a dGPU, a CPU, or a semi-custom SoC. In addition, although not shown, the computing device 102 can include additional SoCs with additional processing cores.

The computing device 102 also includes I/O device(s) 108, which can include, for example, a display, a keypad, a keyboard, or any other suitable I/O device. The computing device 102 also includes one or more network interface(s) 110 to communicate with one or more networks. For example, the network interface(s) 110 can support communications with, for example, any suitable network that allows communication amongst multiple devices (e.g., Ethernet, WiFi, WAN, Internet).

As indicated in FIG. 1, the processing core frequency adjusting logic 104, the processing cores 122, 124, 126, 128, the memory 106, the I/O device(s) 108, and the network interface(s) 110 are each connected to a bus 114. The bus 114 can be any suitable bus, such as a wired or wireless bus, that allows devices to communicate with each other.

In some embodiments, some or all of the functions of the computing device 102 may be performed by any suitable processor or processors that may, for example, execute a software driver, firmware, or any other suitable executable code stored in memory. For example, some or all of the functions of the processing core frequency adjusting logic 104 may be performed by any suitable processing core. In one example, the processing core frequency adjusting logic 104 reads and executes executable instructions from the memory 106. In some embodiments, the processing core frequency adjusting logic 104 may be a CPU, an APU, a GPU, a field programmable gate array (FPGA), an application-specific integrated circuit (ASIC), a microcontroller, as one or more state machines, or as any suitable logic and/or suitable combination of hardware and software, or any other suitable instruction processing device.

The computing device 102 with the processing core frequency adjusting logic 104 adjusts the frequency of the one or more processing cores 122, 124, 126, 128 as described, for example, with respect to FIG. 2 below. In one example, the computing device 102 with the processing core frequency adjusting logic 104 can, either additionally or alternatively, adjust the frequency of processing cores associated with another computing device, such as a remote server. For example, the computing device 102 may communicate with the remote server over one or more networks.

Figure 2:
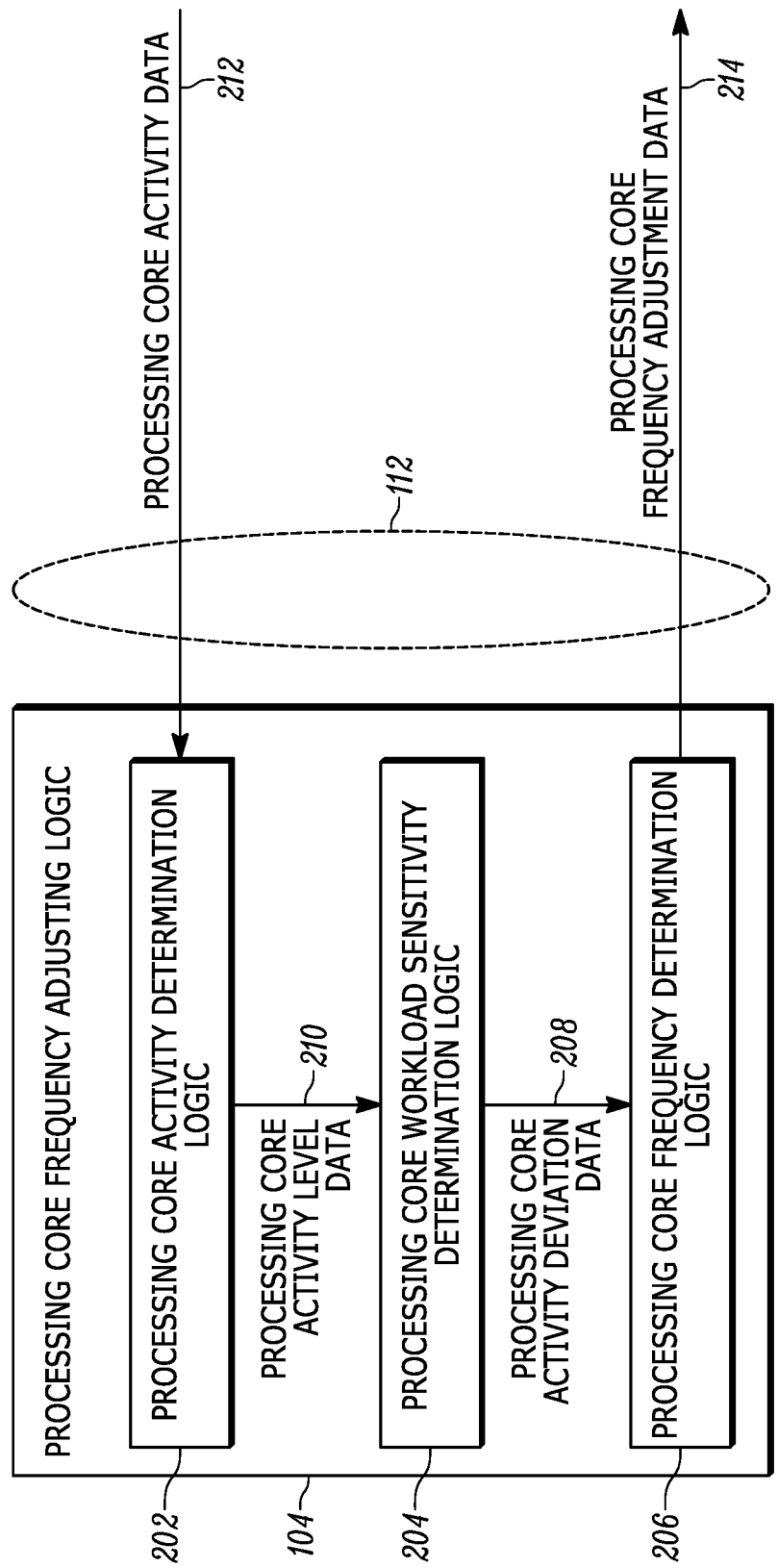
FIG. 2 is a more detailed functional block diagram of the processing core frequency adjusting logic of FIG. 1 in accordance with one example set forth in the disclosure.

FIG. 2 is a more detailed functional block diagram of the processing core frequency adjusting logic 104 of FIG. 1. As indicated in FIG. 2, the processing core frequency adjusting logic 104 includes a processing core activity determination logic 202, a processing core workload sensitivity determination logic 204, and a processing core frequency determination logic 206.

The processing core activity determination logic 202 obtains (e.g., receives) processing core activity data 212 from, for example, one or more processing cores, such as the processing cores processing cores 122, 124, 126, 128 of FIG. 1. The processing core activity data 212 may include data that indicates whether a particular processing core is active (e.g., executing a workload) or idle. The processing core activity determination logic 202 determines, based on the processing core activity data 212, a processing core activity level for a processing core. The processing core activity level indicates, for example, a processor activity percentage over a period of time. In one example, the processing core activity determination logic 202 executes an algorithm that includes Eq. 1 described above. The processing core activity determination logic 202 provides the processing core activity level as processing core activity level data 210 to the processing core workload sensitivity determination logic 204.

The processing core workload sensitivity determination logic 204 determines how much a current QoS for one or more processing cores deviates from a target QoS. For example, based on the processing core activity level data 210, the processing core workload sensitivity determination logic 204 determines a number of active processing cores. For example, the processing core workload sensitivity determination logic 204 can determine that a processing core is active when a percentage of active cycles in a preceding short interval is above a high threshold (e.g., 90%). The processing core workload sensitivity determination logic 204 also determines an expected number of active cores based on, for example, the execution of an algorithm that includes Eq. 2 described above. The processing core workload sensitivity determination logic 204 then determines an activity deviation between the number of active processing cores and the expected number of active processing cores, for example as described above, and provides the activity deviation as processing core activity deviation data 208 to the processing core frequency determination logic 206.

The processing core frequency determination logic 206 then adjusts the frequency of the one or more processing cores based on the processing core activity deviation data 208. For example, the processing core frequency determination logic 206 can cause the frequency of one or more of the processing cores of processing cores 122, 124, 126, 128 of FIG. 1 to be adjusted (e.g., increased or decreased) via processing core frequency adjustment data 214.

Figure 3:
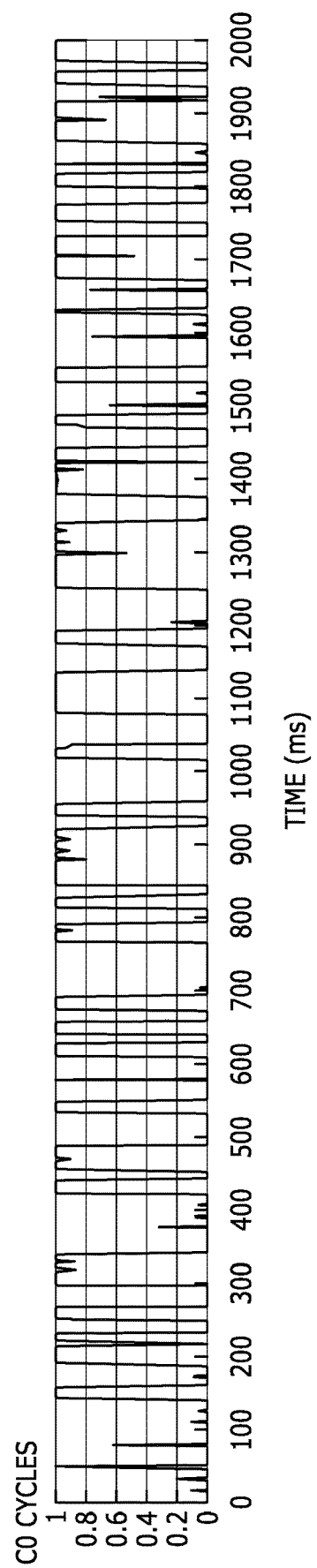
FIG. 3 is a diagram indicating a plot of CPU activity for a single processing core in accordance with one example set forth in the disclosure.

To illustrate the operation of an example algorithm as disclosed herein, FIG. 3 shows a plot of CPU activity for a single core in a system running a benchmark program (such as the SpecPower® benchmark provided by SPEC) in which the workload is at the 50% load level. Although FIG. 3 shows only one processing core for clarity, the load is homogeneous and may look similar for other processing cores. Each point in FIG. 3 shows the percentage of active (i.e., C0) cycles in a 1 ms sample, plotted for the total period of two seconds. From FIG. 3, it is clear that this workload keeps a CPU fully busy while a request is being processed, so that periods of 100% C0 activity alternate with idle periods. In this case, about 50% of the time is idle, reflecting the load level for this phase in the benchmark. The benchmark program (such as the SpecPower® benchmark provided by SPEC) controls the load by measuring the maximum throughput of the system, and then throttles the rate of requests between 0% to 100% in order to measure how power consumption scales with load.

For throughput-based loads similar to this, where processing core utilization is significantly below 100%, the processing cores can be slowed down while maintaining the same throughput, thereby lowering the percentage of idle time. This is the basis for the idle-time QoS algorithm.

Figure 4:
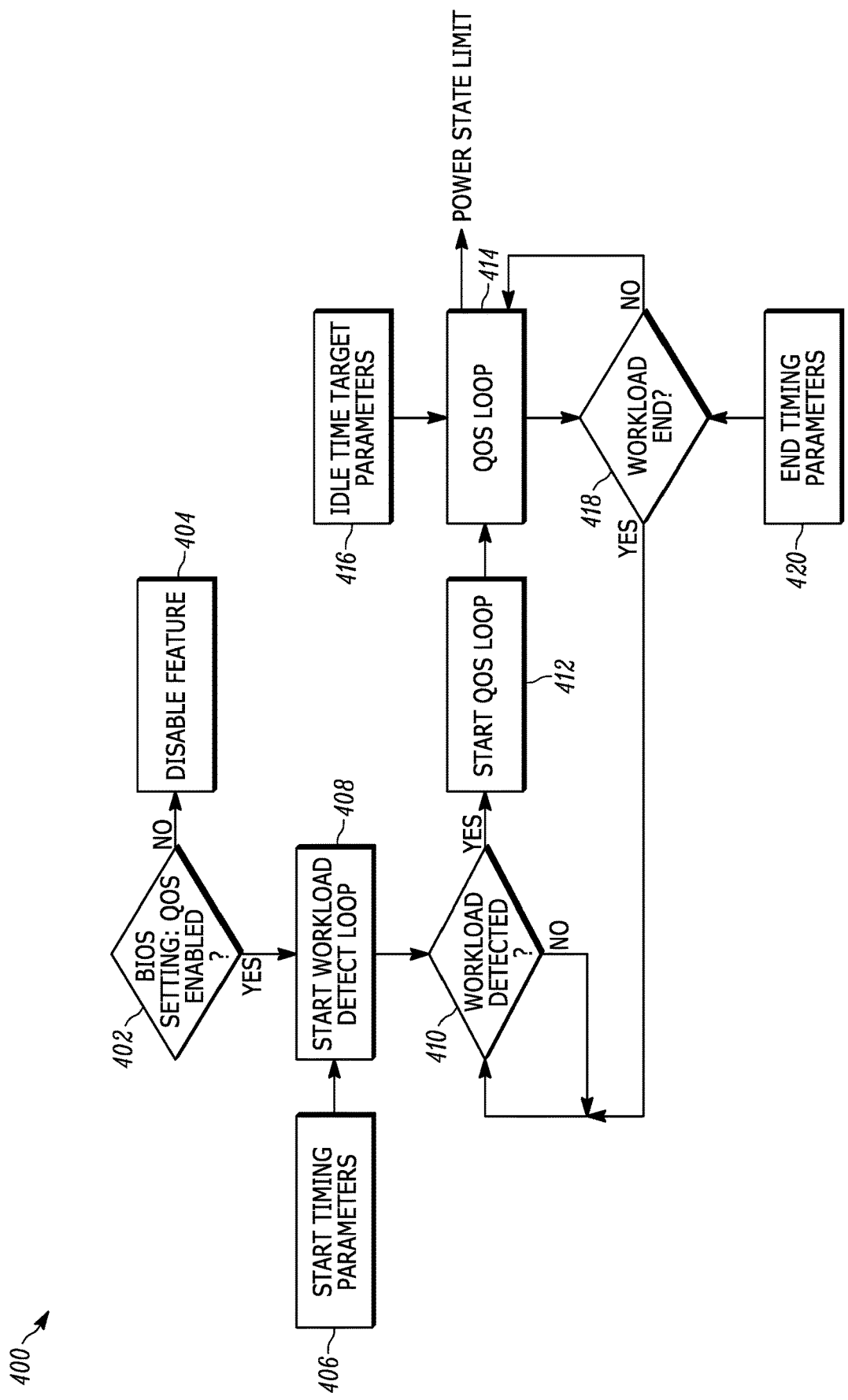
FIG. 4 is a flowchart of an example method for measuring QoS for executing workloads in accordance with one example set forth in the disclosure.

FIG. 4 provides a flowchart 400 of an example method for measuring QoS for executing workloads in accordance with one example set forth in the disclosure. The method illustrated in FIG. 4, and each of the example methods described herein, may be carried out by the computing device 102. As such, the methods may be carried out by hardware or a combination of hardware and hardware executing software. Suitable hardware may include one or more GPUs, CPUs, APUs, ASICs, state machines, FPGAs, digital signal processors (DSPs), or other suitable hardware. Although the methods are described with reference to the illustrated flowcharts (e.g., in FIG. 4), it will be appreciated that many other ways of performing the acts associated with the methods may be used. For example, the order of some operations may be changed, and some of the operations described may be optional. Additionally, while the methods may be described with reference to the example computing device 102, it will be appreciated that the methods may be implemented by other apparatus as well, and that the computing device 102 may implement other methods.

As indicated in FIG. 4, at block 402 a basic input/output system (BIOS) setting determines whether QoS is enabled. If QoS is enabled, a workload detect loop is started at block 408. The method includes obtaining start timing parameters from block 406. Otherwise, the feature is disabled at block 404. Once a workload is detected at block 410, the method proceeds to block 412 to where a QoS loop is started. At block 414, the QoS loop runs to measure QoS on the executing workload. The method includes obtaining, from block 416, idle time target parameters. At block 418, a determination is made as to whether the workload has ended. The method also includes obtaining end timing parameters from block 420. If the workload has ended, the method proceeds back to block 410. Otherwise, the QoS loop continues running at block 414. At block 414, the method also provides a power state limit signal to provide power state changes to one or more processing cores. In one example, one or more of the start timing parameters, idle time target parameters, and end timing parameters are obtained from memory, such as the memory 106 from FIG. 1.

The above detailed description and the examples described therein have been presented for the purposes of illustration and description only and not for limitation. For example, the operations described may be done in any suitable manner. It is therefore contemplated that the present embodiments cover any and all modifications, variations or equivalents that fall within the scope of the basic underlying principles disclosed above and claimed herein. Furthermore, while the above description describes hardware in the form of a processor executing code, hardware in the form of a state machine or dedicated logic capable of producing the same effect, other structures are also contemplated.

What is claimed is:

1. A method for optimizing power efficiency in a computing device with one or more processing cores, the method comprising:

determining, by the computing device, an actual distribution value for the one or more processing cores that are active based on a number of the one or more processing cores that are active and a total number of the one or more processing cores;

determining, by the computing device, an expected distribution value for the number of the one or more processing cores based on the total number of the one or more processing cores and a processing core activity level of the one or more processing cores that are active;

determining, by the computing device, processing core activity deviation data for the one or more processing cores by comparing the actual distribution value for the one or more processing cores that are active and the expected distribution value for the number of the one or more processing cores; and adjusting, by the computing device, a frequency of at least one of the one or more processing cores based on the processing core activity deviation data.

2. The method of claim 1, further comprising:

determining, by the computing device, whether the processing core activity deviation data indicates a homogenous workload for the one or more processing cores; and in response to determining that the processing core activity deviation data indicates the homogenous workload for the one or more processing cores, decreasing the frequency of the at least one of the one or more processing cores by the computing device.

3. The method of claim 2, wherein determining the processing core activity deviation data includes determining how much a current Quality-of-Service (QoS) for the one or more processing cores deviates from a target QoS.

4. The method of claim 1, wherein the number of the one or more processing cores that are active is determined based on the processing core activity level for the one or more processing cores.

5. The method of claim 4, wherein a processing core is determined to be active when a percentage of active cycles in the processing core in a preceding interval is greater than a threshold.

6. The method of claim 5, wherein the preceding interval is based on a moving average window.

7. The method of claim 1, wherein the expected distribution value for the number of the one or more processing cores is determined using a binomial distribution that takes into account the total number of the one or more processing cores and the processing core activity level of the one or more processing cores.

8. The method of claim 1, wherein the expected distribution value for the number of the one or more processing cores is determined based on the number of the one or more processing cores that are active.

9. A system comprising:

a plurality of processing cores; and processing core frequency adjusting logic coupled to the plurality of processing cores, the processing core frequency adjusting logic configured to:

determine an actual distribution value for the plurality of processing cores that are active based on a number of the plurality of processing cores that are active and a total number of the plurality of processing cores;

determine an expected distribution value for the number of the plurality of processing cores based on the total number of the plurality of processing cores and a processing core activity level of the plurality of processing cores that are active;

determine processing core activity deviation data for the plurality of processing cores by comparing the actual distribution value for the plurality of processing cores that are active and the expected distribution value for the number of the plurality of processing cores; and adjust a frequency of at least one of the plurality of processing cores based on the determined processing core activity deviation data.

10. The system of claim 9, wherein the processing core frequency adjusting logic is further configured to:

determine whether the processing core activity deviation data indicates a homogenous workload for the plurality of processing cores; and in response to determining that the processing core activity deviation data indicates the homogenous workload for the plurality of processing cores, decreasing the frequency of the at least one of the plurality of processing cores.

11. The system of claim 10, wherein the processing core frequency adjusting logic is configured to determine the processing core activity deviation data by determining how much a current Quality-of-Service (QoS) for the plurality of processing cores deviates from a target QoS.

12. The system of claim 9, wherein the number of the plurality of processing cores that are active is determined based on the processing core activity level for the plurality of processing cores.

13. The system of claim 12, wherein a processing core is determined to be active when a percentage of active cycles in the processing core in a preceding interval is greater than a threshold.

14. The system of claim 13, wherein the preceding interval is based on a moving average window.

15. The system of claim 9, wherein the expected distribution value for the number of the plurality of processing cores is determined using a binomial distribution that takes into account the total number of the plurality of processing cores and the processing core activity level of the plurality of processing cores.

16. The system of claim 9, wherein the expected distribution value for the number of the plurality of processing cores is determined based on the number of the plurality of processing cores that are active.

17. A server comprising:

a plurality of processing cores;

a network interface; and processing core frequency adjusting logic coupled to the plurality of processing cores and the network interface, the processing core frequency adjusting logic configured to:

determine an actual distribution value for the plurality of processing cores that are active based on a number of the plurality of processing cores that are active and a total number of the plurality of processing cores;

determine an expected distribution value for the number of the plurality of processing cores based on the total number of the plurality of processing cores and a processing core activity level of the plurality of processing cores that are active;

determine processing core activity deviation data for the plurality of processing cores by comparing the actual distribution value for the plurality of processing cores that are active and the expected distribution value for the number of the plurality of processing cores; and adjust a frequency of at least one of the plurality of processing cores based on the determined processing core activity deviation data.

18. The server of claim 17, wherein the processing core frequency adjusting logic is further configured to:
determine whether the processing core activity deviation data indicates a homogenous workload for the plurality of processing cores; and
in response to determining that the processing core activity deviation data indicates the homogenous workload for the plurality of processing cores, decrease the frequency of the at least one of the plurality of processing cores.

19. The server of claim 17, wherein a processing core is determined to be active when a percentage of active cycles in the processing core in a preceding interval is greater than a threshold, wherein the preceding interval is based on a moving average window.

20. The server of claim 17, wherein the expected distribution value for the number of the plurality of processing cores is determined based on the number of the plurality of processing cores that are active.

\* \* \* \* \*